US012715654B2

(12) United States Patent
Hume et al.

(10) Patent No.: US 12,715,654 B2
(45) Date of Patent: Aug. 25, 2026

(54) HOLDER

(71) Applicant: Kira Holdings Pty Ltd, Brisbane (AU)

(72) Inventors: Casey Hume, Brisbane (AU); Daniel Frisby, Brisbane (AU)

(73) Assignee: Kira Holdings Pty Ltd, Brisbane (AU)

( * ) Notice: Subject to any disclaimer, the term of this patent is extended or adjusted under 35 U.S.C. 154(b) by 0 days.

(21) Appl. No.: 18/643,368

(22) Filed: Apr. 23, 2024

(65) Prior Publication Data

US 2024/0383645 A1 Nov. 21, 2024

(51) Int. Cl.

| | |
|---|---|
| ***A45F 5/02*** | (2006.01) |
| ***B25H 3/00*** | (2006.01) |
| ***B65D 1/24*** | (2006.01) |
| ***B65D 23/00*** | (2006.01) |
| *A45F 5/00* | (2006.01) |
| *B44D 3/14* | (2006.01) |

(52) U.S. Cl.

CPC ............ *B65D 23/00* (2013.01); *A45F 5/1583* (2025.01); *B44D 3/14* (2013.01)

(58) Field of Classification Search

CPC .......... A45F 5/00; A45F 5/1583; A45F 5/021; A47G 23/0208; B65D 23/00; E06C 7/14; Y10S 206/806; B05C 21/00; B44D 3/14

USPC ................ 206/372, 806, 446, 427; 215/386; 224/148.7, 269; 248/311.2, 301, 309.1; 211/74, 113; 401/35, 48; D7/701, 620

See application file for complete search history.

(56) References Cited

U.S. PATENT DOCUMENTS

| | | | | | |
|---|---|---|---|---|---|
| 2,681,785 | A * | 6/1954 | Jenny | E06C 7/14 | 248/210 |
| 2,690,283 | A * | 9/1954 | Comploier | B65D 71/0003 | 206/202 |
| 4,324,381 | A * | 4/1982 | Morris | A47K 1/08 | 248/311.2 |
| 4,619,020 | A * | 10/1986 | Lecher, Sr. | A45F 5/02 | 24/3.12 |
| 4,757,927 | A * | 7/1988 | Rutty | A45F 5/02 | 224/904 |
| 5,232,137 | A * | 8/1993 | Devine | A45F 5/02 | 224/678 |
| 5,390,888 | A * | 2/1995 | Rogers | E06C 7/14 | 248/318 |
| 5,433,361 | A * | 7/1995 | O'Malley | A63B 55/408 | 224/558 |
| 5,711,433 | A * | 1/1998 | Smith | A47G 7/044 | 248/312.1 |
| 5,938,160 | A * | 8/1999 | Hartmann | F16M 13/022 | 248/909 |
| 5,992,624 | A * | 11/1999 | Hodson | B25H 3/00 | 248/318 |

(Continued)

FOREIGN PATENT DOCUMENTS

| | | | | |
|---|---|---|---|---|
| AU | 2023203171 A1 * | 12/2024 | | B25H 3/00 |

*Primary Examiner* — Gideon R Weinerth

(74) *Attorney, Agent, or Firm* — JCIP; Joseph G. Chu

(57) ABSTRACT

A holder for one or more adhesive containers having one or more containment portions, each containment portion defining a receptacle to contain one of the one or more adhesive containers, with an opening located at a first end and a support located at a second end, and a connection portion adjacent the one or more containment portions, the connection portion extending away from the one or more containment portions.

16 Claims, 6 Drawing Sheets

(56) References Cited

U.S. PATENT DOCUMENTS

| | | | | | |
|---|---|---|---|---|---|
| 6,390,705 | B1 * | 5/2002 | Dailey | B44D 3/14 | 401/121 |
| D497,525 | S * | 10/2004 | Vlahakis | D7/622 | |
| 7,044,291 | B1 * | 5/2006 | Mumford | B25H 3/00 | 294/162 |
| 7,559,514 | B1 * | 7/2009 | Wynter | A47J 47/16 | 206/427 |
| 7,604,211 | B2 * | 10/2009 | Moore | B65D 71/50 | 248/346.03 |
| 8,033,585 | B1 * | 10/2011 | Wilson | B44D 3/14 | 294/159 |
| 8,118,339 | B2 * | 2/2012 | Knudson | A45F 5/00 | 294/162 |
| D679,146 | S * | 4/2013 | Rincon | D7/620 | |
| 9,848,691 | B1 * | 12/2017 | Pedersen | A45F 5/10 | |
| D1,076,606 | S * | 5/2025 | Lou | D7/701 | |
| 12,296,617 | B2 * | 5/2025 | Compo | B44D 3/14 | |
| D1,081,279 | S * | 7/2025 | Lou | D7/619.1 | |
| D1,099,640 | S * | 10/2025 | Hume | D7/619.1 | |
| 2004/0089688 | A1 * | 5/2004 | Perez | A45F 5/021 | 224/242 |
| 2006/0255233 | A1 * | 11/2006 | Wawerski | B44D 3/14 | 248/689 |
| 2007/0138225 | A1 * | 6/2007 | Duchesne | B60R 11/00 | 224/544 |
| 2008/0283563 | A1 * | 11/2008 | O'Donnell | A45F 5/02 | 224/269 |
| 2010/0096521 | A1 * | 4/2010 | White | A47G 23/0225 | 248/314 |
| 2018/0368600 | A1 * | 12/2018 | Hayward | A47G 23/0216 | |
| 2021/0163199 | A1 * | 6/2021 | Rattanapaibooncharoen | A47G 23/0225 | |
| 2024/0383645 | A1 * | 11/2024 | Hume | A45F 5/1583 | |
| 2024/0416675 | A1 * | 12/2024 | Compo | B44D 3/14 | |

* cited by examiner

HOLDER

RELATED APPLICATIONS

The present application claims priority to the Australian Application No. 2023203171 with the filing date of May 19, 2023, the contents of which are incorporated in its entireties by reference herein.

FIELD OF INVENTION

The present invention relates to a holder. The present invention has particular but not exclusive application for a holder for holding glue bottles. The patent specification describes this use but it is by way of example only and the invention is not limited to this use.

BACKGROUND OF THE INVENTION

Adhesives are often used when installing PVC plumbing fixtures and other types of plumbing fixtures. The adhesives are often contained in containers. These containers are often referred to as glue bottles. These glue bottles can have a cap with an integrated applicator.

A problem with these glue bottles is that they can easily be misplaced. Another problem with these glue bottles is that due to the way they are used, the adhesive typically ends up running down the sides of the bottles.

Setting the glue bottles down on a surface can lead to adhesive stains that are unsightly and need to be cleaned.

Pouches have been used with glue bottles. However, the problem with pouches is that the adhesive on the sides of the bottles can accumulate in the pouches. This can lead to problems such as the pouches requiring cleaning or in extreme cases the glue bottles becoming stuck in the pouches, or no longer fitting into the pouches.

OBJECT OF THE INVENTION

It is an object of the present invention to overcome or at least alleviate one or more of the above mentioned problems with glue bottles and/or provide the consumer with a useful or commercial choice.

SUMMARY OF THE INVENTION

In one aspect, the present invention broadly resides in a holder for one or more adhesive containers having one or more containment portions, each containment portion defining a receptacle to contain one of the one or more adhesive containers, with an opening located at a first end and a support located at a second end; and a connection portion adjacent the one or more containment portions, the connection portion extending away from the one or more containment portions.

Preferably, the one or more containment portions are two containment portions. In a less desirable embodiment, the one or more containment portions is one containment portion.

In another aspect, the present invention broadly resides in a holder for one or more adhesive containers having two containment portions, each containment portion defining a receptacle to contain one of the one or more adhesive containers, with an opening located at a first end of the receptacle and a support located at a second end of the receptacle; and a connection portion adjacent the containment portions, the connection portion extending away from the containment portions.

Preferably each containment portion includes at least one biasing member extending into the receptacle. Preferably each biasing member extends inwardly relative to the corresponding receptacle. Preferably the at least one biasing member is adapted to abut an adhesive container in the corresponding receptacle. Preferably the at least one biasing member aids in retaining an adhesive container in a corresponding receptacle. Preferably each biasing member is attached to the containment portion towards the opening of the corresponding receptacle. Preferably a portion of each biasing member is biased inwardly relative to the corresponding receptacle. Preferably the at least one biasing member is a plurality of biasing members. Preferably the at least one biasing member is four biasing members for each receptacle.

Preferably the connection portion includes an aperture. Preferably the connection portion has a ramp portion associated with the aperture. Preferably the aperture is adapted to receive a belt clip of a tape measure. Preferably the ramp portion is adapted to bias the belt clip towards an open condition. Preferably the aperture is substantially rectangular in shape.

Preferably the connection portion includes an attachment portion. In one embodiment, the attachment portion is in the form of a hook. In another embodiment, the attachment portion is in the form of a belt clip. Preferably the connection portion includes a slot. Preferably the slot is adapted to receive a fastener such as a nail or screw or the like. Preferably the holder can be suspended from a fastener via the slot.

Preferably the attachment portion includes two opposed ridges. Preferably the two opposed ridges are adapted to releasably retain the holder on a pipe or tube of a predetermined diameter.

Preferably the opening of each receptacle is substantially circular in shape. Preferably each opening is between 30 mm and 200 mm in diameter. More preferably each opening is between 50 mm and 120 mm in diameter.

Preferably each support extends from at least one side of the corresponding receptacle to another side of the receptacle. Preferably each support is located towards a bottom of each receptacle relative to the opening located at the top of each receptacle. Preferably each support includes at least one cross member. Preferably each cross member has a length which is greater than it's width. Preferably each support defines one or more opening. Preferably each support defines a plurality of openings. Preferably an area defined by the one or more openings is greater than an area defined by the corresponding support.

Preferably each receptacle includes one or more side walls located between the opening and the support. Preferably the one or more side walls of each receptacle define one or more openings. Preferably an area defined by the one or more openings is greater than an area defined by the corresponding one or more side walls.

Preferably the holder is made predominantly of a plastic material. Preferably the holder is made using injection moulding. Preferably the plastic material is resistant to PVC solvent cement. In one embodiment, the holder is predominantly made of a composite material. In another embodiment, the holder is predominantly made of metal.

Preferably the holder is an adhesive container holder.

The features described with respect to one aspect also apply where applicable to all other aspects of the invention.

Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

With reference to FIGS. 1 to 6, there is shown an adhesive container holder 10 according to an embodiment of the present invention.

The holder 10 has a first containment portion 12 and a second containment portion 14. Each containment portion 12, 14 has an opening 16, 18 defining receptacles.

Figure 1:
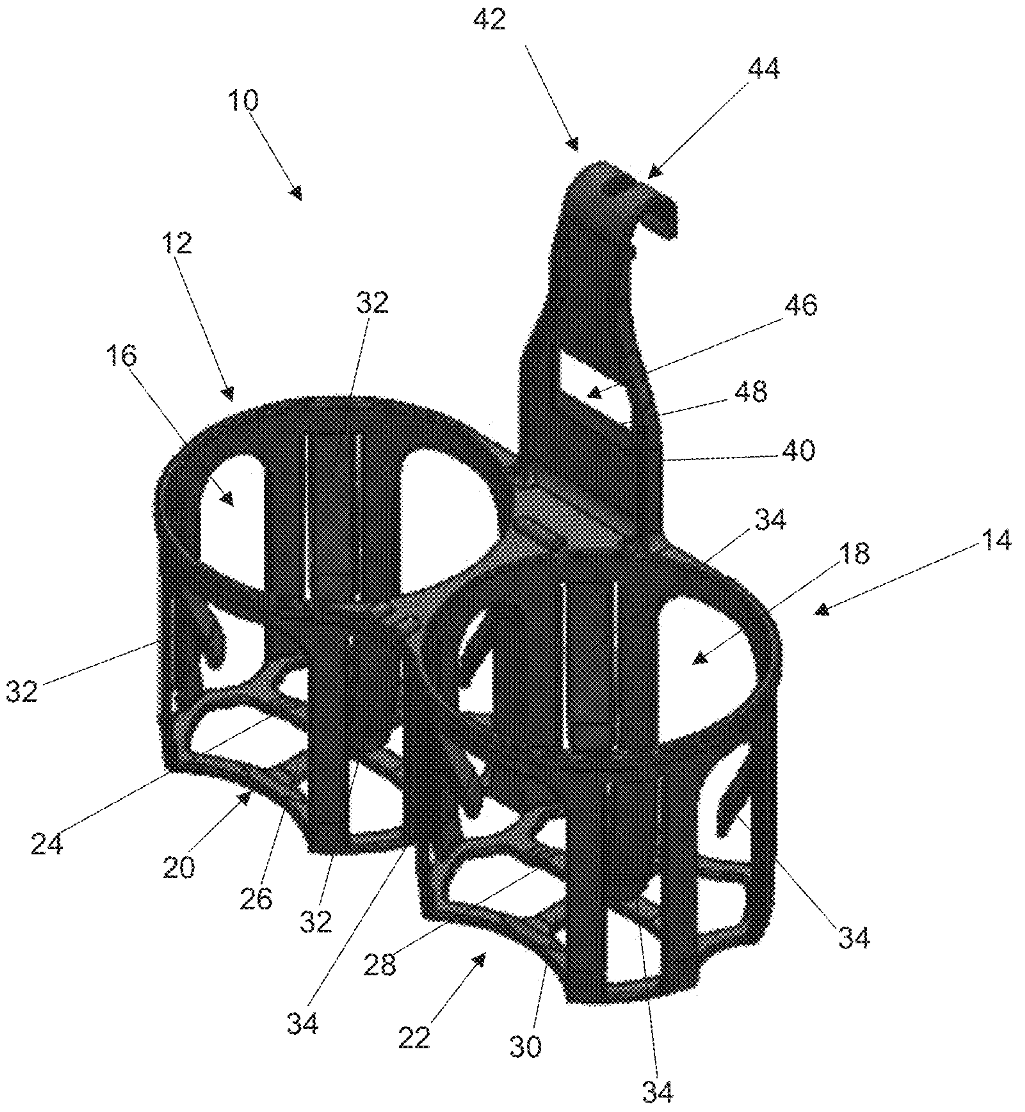
FIG. 1 is a perspective view of a holder according to an embodiment of the present invention.
Figure 2:
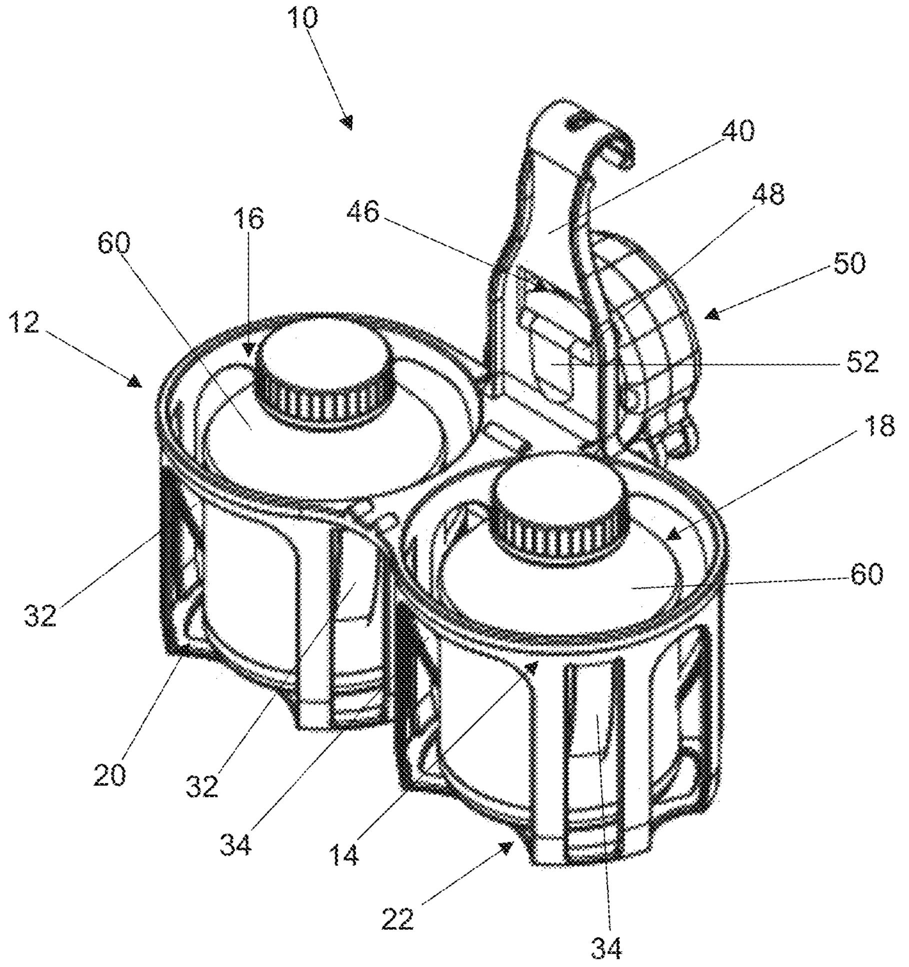
FIG. 2 is a perspective view of the holder of FIG. 1 holding two adhesive containers.
Figure 3:
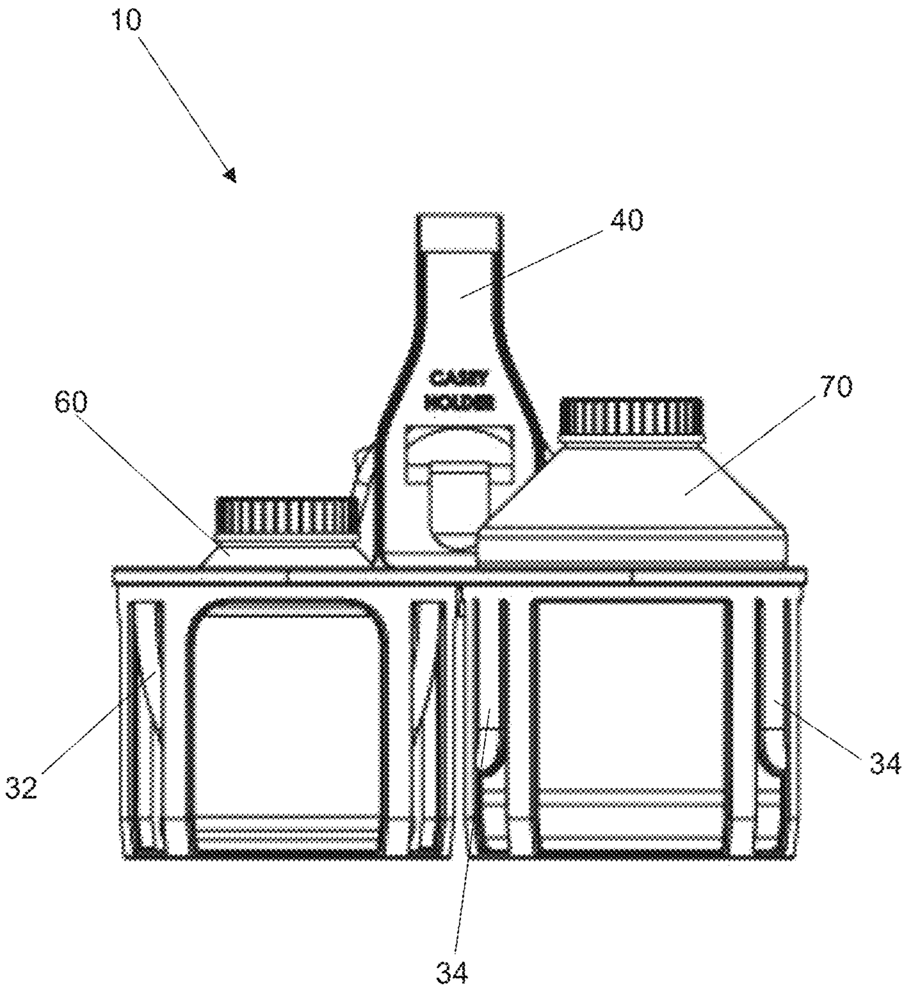
FIG. 3 is a front view of the holder of FIG. 1 holding two adhesive containers.
Figure 4:
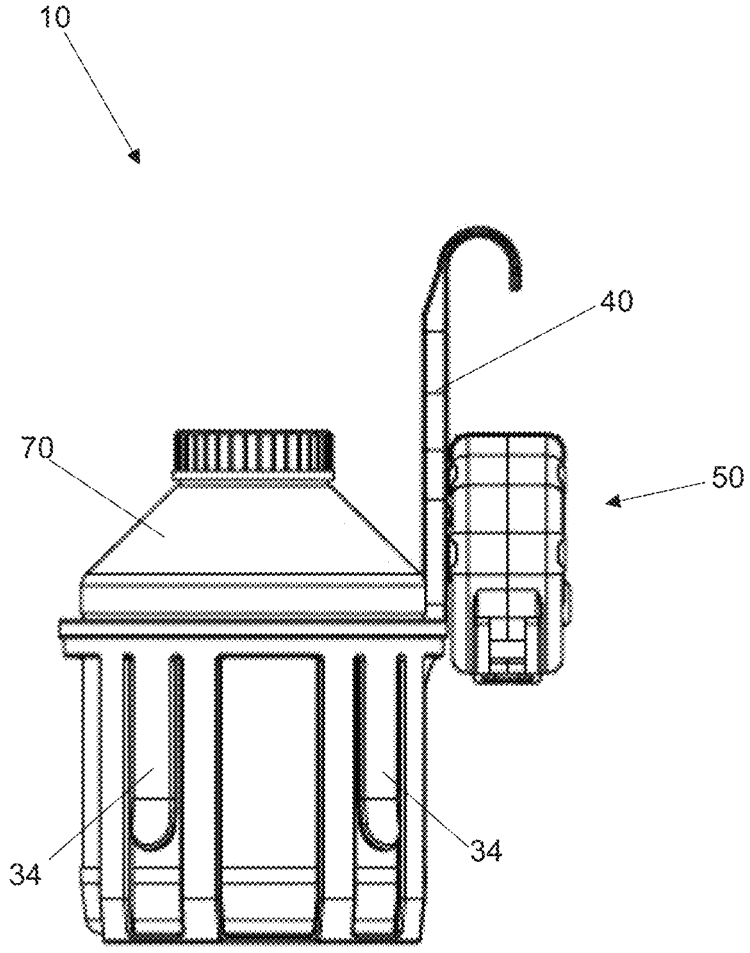
FIG. 4 is a side view of the holder of FIG. 3.
Figure 5:
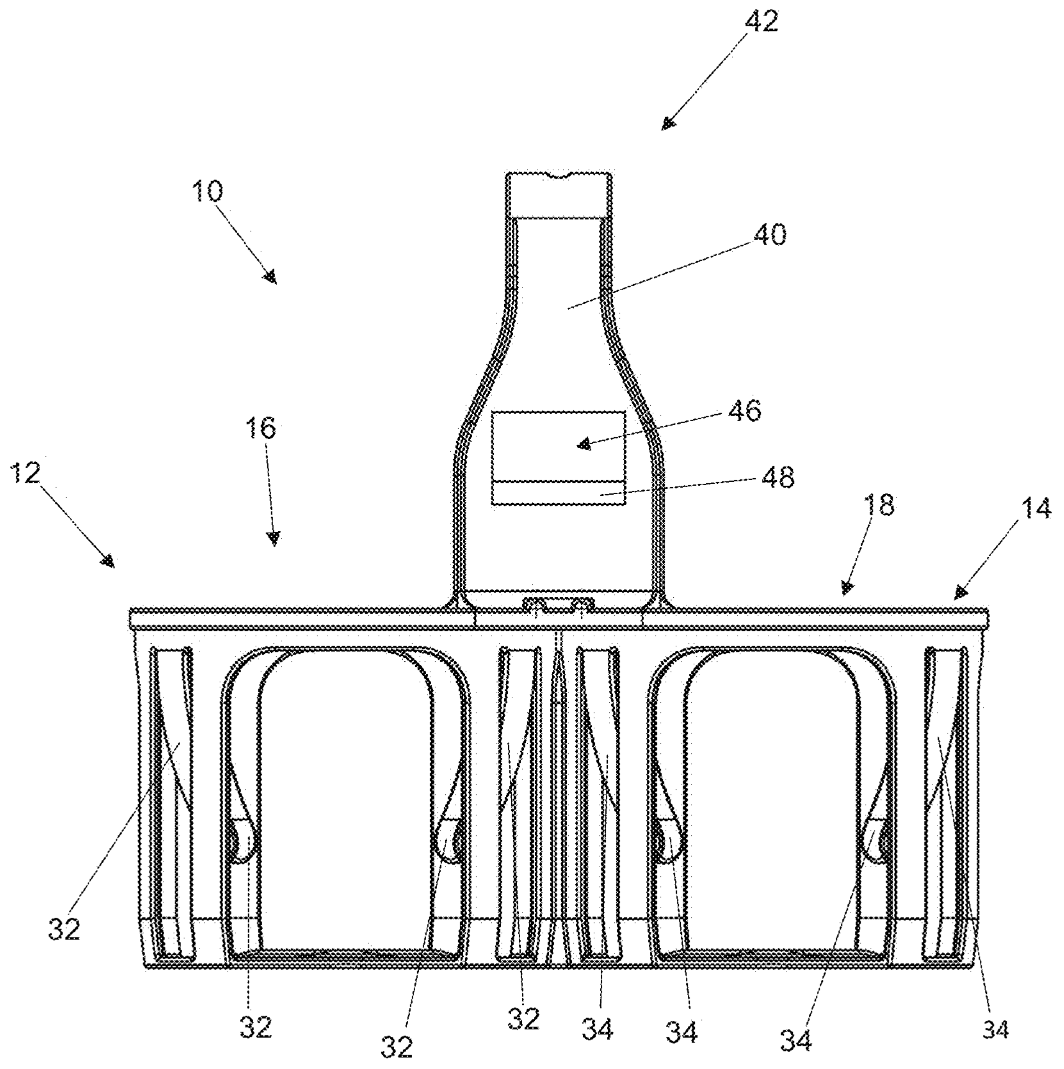
FIG. 5 is a front view of the holder of FIG. 1.
Figure 6:
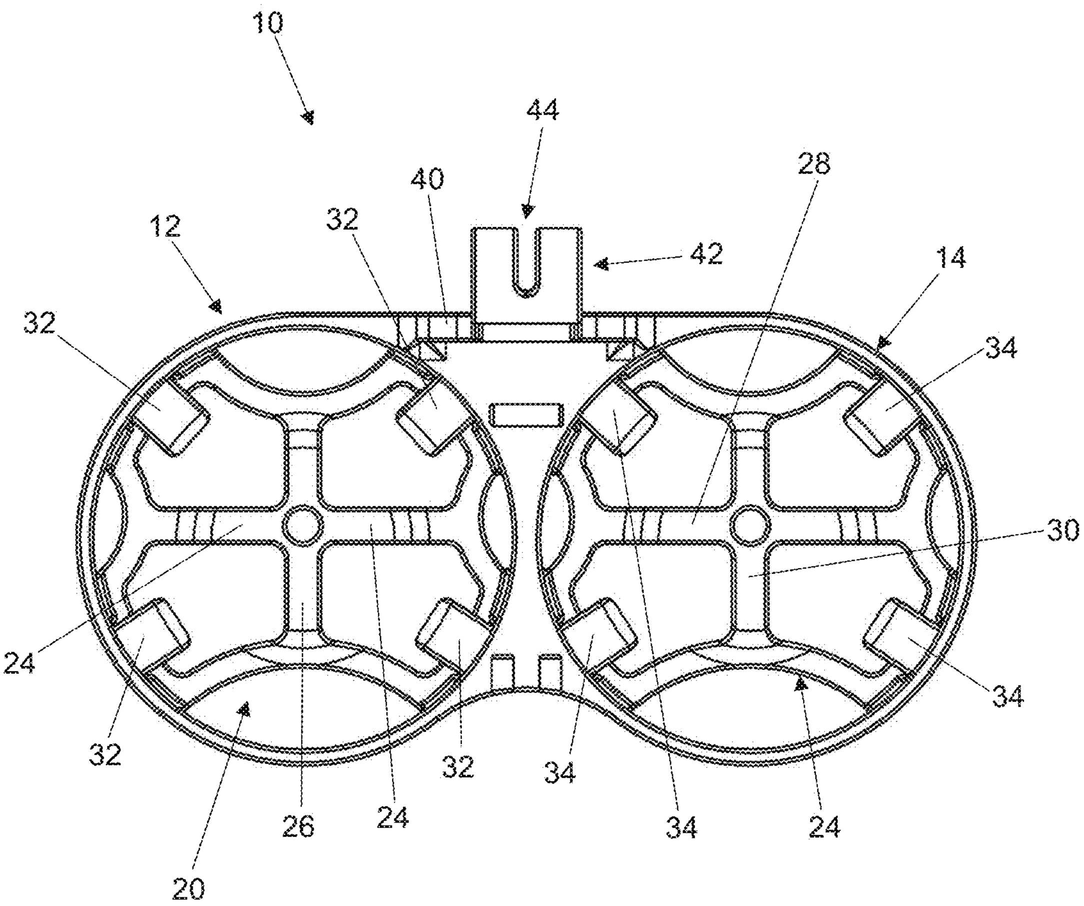
FIG. 6 is a top view of the holder of FIG. 1.

Each containment portion 12, 14 includes a support 20, 22. The supports 20, 22 are adapted to support a bottom part of an adhesive container 60 (as best seen in FIG. 2). Each support 20, 22 has cross members 24, 26, 28, 30. The supports 20, 22 define openings such that adhesive (not shown) from adhesive containers 60 does not accumulate in the containment portions 12, 14.

Each containment portion 12, 14 has a plurality of biasing members 32, 34. The biasing members 32, 34 extend inwardly into the receptacles. The biasing members 32, 34 are adapted to abut the adhesive containers 60 in the corresponding receptacle. The biasing members 32, 34 are also adapted to abut adhesive containers 60, 70 of different sizes. The biasing members 32, 34 aid in retaining an adhesive container 60, 70 in a corresponding receptacle.

The holder 10 has a connection portion 40 extending away from the openings 16, 18. The connection portion 40 includes an attachment portion in the form of a hook 42. The hook 42 includes a slot 44 adapted to receive a fastener (not shown) such as a nail or screw or the like such that the holder 10 can be suspended from the fastener. The connection portion 40 includes an aperture 46. The connection portion 40 has a ramp portion 48 associated with the aperture 46. The aperture 46 is adapted to receive a belt clip 52 of a tape measure 50. The ramp portion 48 is adapted to bias the belt clip 52 towards an open condition.

Advantages

An advantage of the preferred embodiment of the holder includes that different sized adhesive container can be held. Another advantage of the preferred embodiment of the holder includes inhibiting adhesive containers from becoming stuck in the holder. A further advantage of the preferred embodiment of the holder includes having an attachment for a tape measure.

Variations

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A holder for one or more adhesive containers having two containment portions, each containment portion defining a receptacle to contain one of the one or more adhesive containers, with an opening located at a first end of the receptacle and a support located at a second end of the receptacle; and a connection portion adjacent the containment portions, the connection portion extending away from the containment portions, wherein each containment portion includes at least one biasing member extending into the receptacle, the at least one biasing member adapted to abut an adhesive container in the corresponding receptacle to aid in retaining the adhesive container in the corresponding receptacle;

wherein the connection portion includes an attachment portion in the form of a hook; and wherein the attachment portion includes a slot adapted to receive a fastener, and wherein the slot enables the holder to be suspended from the fastener.

2. The holder as claimed in claim 1, wherein each biasing member extends inwardly relative to the corresponding receptacle.

3. The holder as claimed in claim 1, wherein each biasing member is attached to the containment portion towards the opening of the corresponding receptacle.

4. The holder as claimed in claim 1, wherein a portion of each biasing member is biased inwardly relative to the corresponding receptacle.

5. The holder as claimed in claim 1, wherein the at least one biasing member is a plurality of biasing members.

6. The holder as claimed in claim 1, wherein the at least one biasing member is four biasing members for each receptacle.

7. The holder as claimed claim 1, wherein the connection portion includes an aperture, the aperture is adapted to receive a belt clip of a tape measure.

8. The holder as claimed in claim 7, wherein the connection portion has a ramp portion associated with the aperture, the ramp portion is adapted to bias the belt clip towards an open condition.

9. The holder as claimed in claim 1, wherein each support defines one or more openings.

10. The holder as claimed in claim 9, wherein an area defined by the one or more openings is greater than an area defined by the corresponding support.

11. The holder as claimed in claim 1, wherein each receptacle includes one or more side walls located between the opening and the support.

12. The holder as claimed in claim 11, wherein the one or more side walls of each receptacle define one or more openings.

13. The holder as claimed in claim 12, wherein an area defined by the one or more openings is greater than an area defined by the corresponding one or more side walls.

14. A holder for one or more adhesive containers having one or more containment portions, each containment portion defining a receptacle to contain one of the one or more adhesive containers, with an opening located at a first end and a support located at a second end; and a connection portion adjacent the one or more containment portions, the connection portion extending away from the one or more containment portions, wherein each containment portion includes at least one biasing member extending into the receptacle, the at least one biasing member adapted to abut an adhesive container in the corresponding receptacle to aid in retaining the adhesive container in the corresponding receptacle;

wherein the connection portion includes an attachment portion in the form of a hook; and wherein the attachment portion includes a slot adapted to receive a fastener, and wherein the slot enables the holder to be suspended from the fastener.

15. The holder as claimed in claim 14, wherein the one or more containment portions are two containment portions.

16. The holder as claimed in claim 14, wherein the holder is an adhesive container holder.

* * * * *